Dec. 14, 1937.  H. M. EPSTEIN  2,101,988
INSECT BAIT
Filed Jan. 25, 1936
Fig: 1 
Fig: 2 
Fig: 3 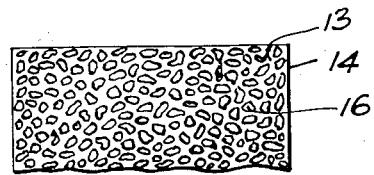
Fig: 4 
Fig: 5 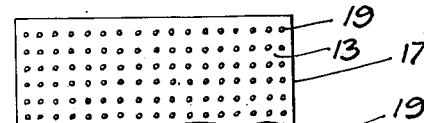
Fig: 6 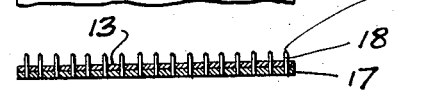
Fig: 7 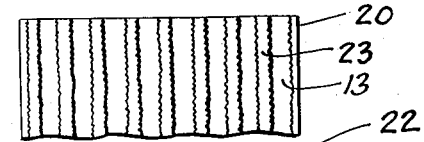
Fig: 8 
Fig: 9 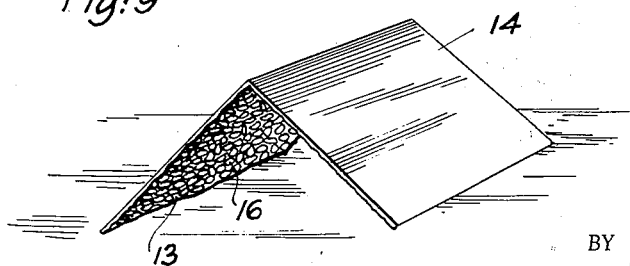
HARRY M. EPSTEIN
INVENTOR.
BY Walter E. Wallheim
ATTORNEY.

Patented Dec. 14, 1937

2,101,988

UNITED STATES PATENT OFFICE 2,101,988

INSECT BAIT

Harry M. Epstein, New York, N. Y.

Application January 25, 1936, Serial No. 60,813

3 Claims. (Cl. 43—131)

This invention refers to baits used in the exterminating of insects and to the method of preparing such baits.

Briefly the invention consists in taking a sheet of material having a roughened surface and applying an insecticide thereupon. The material is preferably a sheet of what is termed in the trade "sand paper" made by securing emery, carborundum or other abrasive upon paper. Or, any other material, such as wood, metal, bakelite and the like may be used preferably in sheet form, in which are imbedded pointed prongs or the like, or which material is so shaped as to present sharp projections exteriorly.

The purpose of the so-treated bait is to provide means which will cause insects to nibble or partake of the poisonous insecticide but which will prevent other animals from being poisoned by it. This is accomplished simply by the sharp or rough projections from the bait. Should a dog or other animal, attracted possibly by the odor of the insecticide, attempt to lick up the insecticide, its tongue will contact with the tops of the projections which present a roughened surface to the tongue, objectionable to the animal, and so discourage any further attempts to do so. The small insects, however, have free access to the insecticide imbedded between the rough projections.

In the following specification I have described certain desirable forms of bait, as well as a preferred method of preparing it, the accompanying drawing illustrating diagrammatically various embodiments of the principles of the invention referred to herein.

In this drawing, which is drawn at a greatly enlarged scale,

Fig. 1 is a fragmentary plan view of a piece of material having pointed projections or ridges molded in its surface;

Fig. 2 is a cross-sectional view through the same;

Fig. 3 is a fragmentary plan view of a piece of commericial sand-paper employed for the purpose specified;

Fig. 4 is a cross-sectional view through the same;

Fig. 5 is a fragmentary plan view of a piece of material having prongs imbedded therein;

Fig. 6 is a cross-sectional view through the same;

Fig. 7 is a fragmentary plan view of a sheet of material crinkled for the purpose specified;

Fig. 8 is a cross-sectional view through the same; and

Fig. 9 is a perspective view of the bait showing its preferred method of application.

Like characters of reference denote similar parts throughout the several views and the following specification.

Referring now particularly to Figs. 1 and 2, 10 represents a piece of molded material, such as metal, bakelite or the like. Its top surface is provided with projections 11, having pointed ends 12. These projections may be longitudinal and continuous as shown in Fig. 1, or they may be in form of a series of short projections, or a combination of both. 13 is an insecticide deposited upon the surface so as to become imbedded between the projections, the tops of which preferably extend above the layer of insecticide.

In Figs. 3 and 4, a sheet of commercial sand paper is illustrated, consisting of a sheet of paper 14 sprinkled with a ground abrasive 15, such as sand, carborundum or glass, for instance, presenting a roughened surface. The insecticide 13 is imbedded between the abrasive 15, the extreme tops 16 of which project preferably above the insecticide.

In Figs. 5 and 6 is shown a sheet 17 of suitable material having inserted a number of prongs 18 therein in brush-like fashion. The insecticide 13 is imbedded between the prongs, their tops 19 preferably projecting above it.

In Figs. 7 and 8, a sheet 20 of crinkled material, such as paper, cardboard, or the like, having a roughened surface 21 is shown. The sheet is crinkled or pressed in wave-like form forming projections 22. These projections may be either continuous as shown in Fig. 7 or in series of short ones, or in fact in any desired shape whereby projections are formed. The insecticide 13 is imbedded between the projections 22. The uppermost parts 23 of the projections again preferably extend above the layer of insecticide.

The various types of bait described above are illustrative only of embodiments of my invention, and I do not wish to be restricted to any of the particular types shown or any combinations thereof. Any roughened surface which lends itself to maintaining an insecticide upon it will answer the purpose of my invention. Instead of using flat sheets the surface of which is roughened on one side only, I may use materials in sheet or other convenient form which is roughened at both sides, or I may use a porous material which may absorb the insecticide and at the same time present a rough surface at either, both or all sides.

The application and the use of the bait is a very simple one. The insecticide which may be either a liquid or a powder or a salve is sprinkled or otherwise placed upon the sheet of material which is usually cut up in small square pieces for commercial handling and ready application in a number of places.

In sprinkling an insecticide, as heretofore, directly upon or near the vermin or insect infested spot, dogs, cats or other animals, attracted possibly by the odor of the insecticide, could lick up the insecticide which generally being highly poisonous, often is fatal to such animals. With the use, however, of any of the materials described or their equivalents, there is a roughened surface presented to the tongues of animals who may be desirous of licking up the insecticide which discourages any further attempts to do so. This, however, in no way prevents small insects, such as ants, or the like, from free access to the insecticide with its subsequent desired results.

One of the most preferred methods of applying the insecticide especially when in the form of a viscous liquid, is to take a sheet of the material cut in square shape, such as sand paper, for instance, wet it, and then drop or sprinkle the insecticide upon it. By capillary attraction then, the insecticide will cover the entire surface, especially when the material is of a liquid absorbing character. These so-treated squares are then placed near an insect-infested spot as described above. I also find it of great advantage to fold the square piece of material and place it in tent-like shape near the insect-infested spot as, for instance, shown in Fig. 9, in such a way that the insecticide treated surface faces the ground. In such a position, especially when the insects are in spots which are exposed to light, the treated surface attracts the insects more readily because it is in the dark, than if the material were laid down flat. Instead of being shaped like a tent the material may, of course, be folded in any desired shape.

Besides preventing poisoning of animals, as explained above, the roughened surface also acts as a retainer for the insecticide, especially when the same is in form of a powder or in crystals.

It is understood that various changes in the form and composition of the materials employed may be resorted to and changes made in the method of applying the bait without departing from the principles or sacrificing any of the advantages of the invention as defined in the appended claims.

What I claim as new, is:

1. A bait for insects comprising a sheet of material, adapted to be placed over an insect-infested spot, pointed projections upon and over its entire lower surface facing the said spot, and an insecticide imbedded between the projections leaving the points of the projections exposed for the purpose of lacerating the tongues of animals attempting to lick up the insecticide.

2. A bait for insects comprising a piece of flat material adapted to be folded and placed over an insect-infested spot, the said material having its entire lower surface roughened, and an insecticide applied to the said surface leaving the top portions of the said roughened surface exposed for the purpose of lacerating the tongues of animals attempting to lick up the insecticide.

3. A bait for insects adapted to be placed over an insect-infested spot comprising a hood triangular in cross-section and open at its base consisting of a single sheet of material, pointed projections upon and over its entire lower surface toward the open base, and an insecticide imbedded between the projections leaving the points of the projections exposed for the purpose of lacerating the tongues of animals attempting to lick up the insecticide.

HARRY M. EPSTEIN.